Dec. 7, 1943.        J. B. SWAN        2,336,314
AIR VENT OILER
Filed Nov. 21, 1941
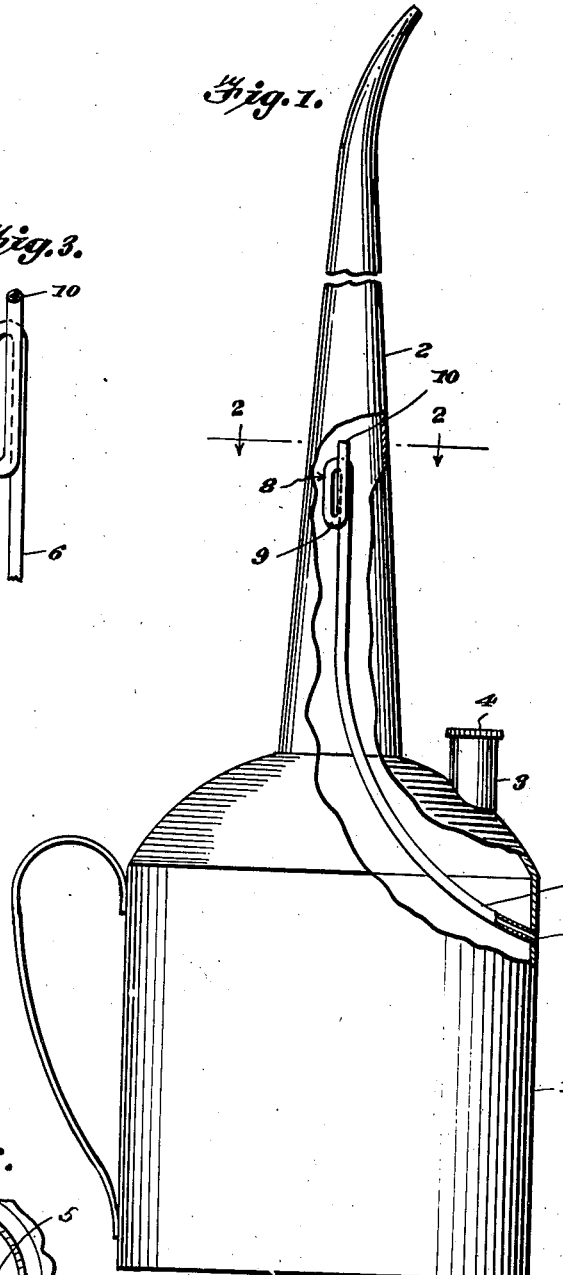
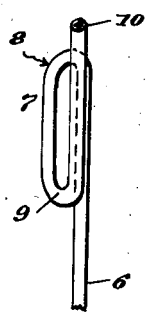
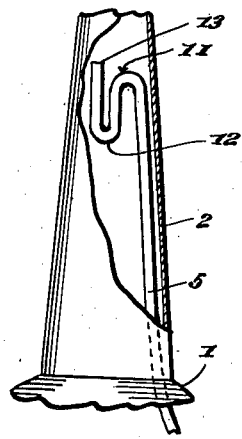
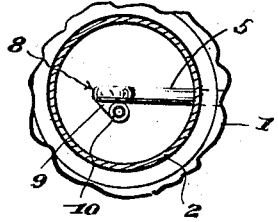
Inventor,
JOHN B. SWAN.
By E. E. Vrooman & Co.,
His Attorneys.

Patented Dec. 7, 1943

2,336,314

UNITED STATES PATENT OFFICE 2,336,314

AIR-VENT OILER

John B. Swan, Gladstone, Mich.

Application November 21, 1941, Serial No. 420,032

1 Claim. (Cl. 221—39)

This invention relates to an air-vent oiler, and the principle of the invention can be applied to all kinds of oil cans.

An object of the invention is the provision of simple, novel, and efficient means for supplying air to the spout of an oiler whereby the oil will flow freely through the spout when the oiler is in operation.

Another object of the invention is to provide a workable device to prevent back-flow of oil through the air pipe to the outer surface of the can and to eliminate any air vent in the oiler cap, in order to keep the outer surface of the can free from oil.

A still further object of the invention is to provide a workable device for control of oil from the spout by stopping the air supply at the point of intake.

Another object of the invention is the provision of novel and efficient trap means as a unitary part of an air tube arranged in the oiler.

A still further object of the invention is the construction of a novel and efficient trap device as a part of the air tube of an oiler, whereby the oiler spout is freely supplied with fresh air during operation, but oil is prevented from back-flowing through the air tube by reason of the trap device when the oiler is in an upright or inoperative position.

With the foregoing and other objects in view, my invention comprises certain constructions, combinations, and arrangements of parts as will be hereinafter fully described, illustrated in the accompanying drawing, and more particularly pointed out in the appended claim.

In the drawing:

Figure 1 is a view in elevation of an oiler, part being broken away to show the air tube and its trap device in position therein.

Figure 2 is an enlarged sectional view taken on line 2—2, Figure 1 and looking in the direction of the arrows.

Figure 3 is an enlarged view of the trap device of the air tube.

Figure 4 is a fragmentary view of another embodiment of the present invention.

Referring to the drawing, in which I have shown in Figures 1 to 3 the preferred embodiment of this invention, 1 is the container and 2 is the spout thereof. The usual filler 3 and closed cap 4 are formed on the container 1.

An air tube 5 is fixedly secured at its lower end to the container 1, and this tube opens at 6 upon the outer atmosphere. On the upper end of air tube 5 entirely within spout 2 is formed the trap device 7. This trap device 7 comprises an elongated loop 8, parallel with a portion of the tube 6. This loop 8 forms a trap 9 at its lower end to prevent back-flow of any oil into the major part of the air tube 6. The upper open discharge-end 10 is placed in the center of spout 2, thereby allowing free passage of the discharging oil through spout 2 while at the same time affording practically no opportunity for oil to enter the trap through discharge-end 10 when the oiler is placed in an upright position. However, if a slight quantity of oil should enter the small air opening 10, it will be caught or retained in the trap portion 9 of the loop 7 and will be discharged immediately upon the oiler being placed in operation, that is to say, when the spout 2 is turned downwardly or in an inverted position. Consequently, by this novel construction of the air tube there are no parts to get out of order, thereby assuring free circulation of air through tube 5 when the device is operating, resulting in a free flow of oil out of the spout 2.

In the embodiment shown in Figure 4 the air tube 5 is provided on its upper end with a substantially S-shape trap device 11, which has a trap portion 12 functioning similar to trap portion 9 of the preferred embodiment. The discharge end 13 of trap 11 is positioned away from the inner walls of spout 2, thereby insuring free passage of oil from the container 1 out of spout 2. Any oil that might enter the small opening at 13 will be held in trap 12, whereby the major portion of the air tube 5 will not be contaminated but left free for excellent functioning.

The air is introduced into the spout 2, so that when the can is turned upright, the oil will not flow back through the air vent to the outside of the can. The air vent 5 runs up into the spout above the level of the oil in the can. The spout at such place is considerably larger than the small end of the spout where the oil flows out. When the spout of the can is turned down for the oil to flow out, unless air is admitted into the spout on the can atmospheric pressure will be created, which will prevent the flow of the oil from the end of the spout.

When the can ceases to be used and is turned upright, such oil as has entered the upper end of the air vent 5, flows back to the bend or trap in the pipe and stops there, because it cannot flow up, and there is no force behind the oil which enters the air vent at 10. When the can is again used it is turned with the spout down and whatever oil may have run into the end of the air vent (at 10 or 13) naturally flows down and out of the air vent through the force of gravity, and this allows the air to come in and thus relieve the atmospheric pressure in the spout and can, caused by the flow of the oil from the small end of the spout.

The purpose of this invention is to obviate the back flow of oil through the air vent to the outside of the can, which condition obtains with reference to the can commonly in use. The engineer's glooves soon become saturated with the oil and some of the oil is wasted.

Another reason for inserting the air vent into the spout is this: Where the air vent opens merely into the top of the body of the can, oil rushes into the large end of the spout and the action of the air introduced lower down in the can is too slow. The oil being generally fairly heavy the result has been that the average locomotive engineer cuts a piece off the smaller end of the spout, so that the oil will flow faster. When this is done, there is a great deal of oil wasted, because the oil flows out at times, much faster than is necessary, and there being such a large quantity of oil going out the spout when the can is turned upright, some of the oil runs down on the outside of the spout and down on the body of the can itself.

Still another reason for my novel device is that in the type of oiler in use at present, which, of course, has an air vent, the valve mechanism becomes so loose that oil works out of the body of the can around the valve adjustment device.

To summarize, the air is introduced into the spout through an air vent or air intake, so that it will be nearer to the small end of the spout where the oil goes down, thus affording quicker action. The air is not introduced to mix with the oil, but to relieve the atmospheric pressure for permitting pouring the oil from the can. Further, the novel device places the end of the air vent above the oil level so that the oil can flow back to the inside of the can when the oiler is not in use, and stop the flow of oil back through the air outlet, through the outside of the can.

While I have described the preferred embodiments of my invention and illustrated the same in the accompanying drawing certain minor changes or alterations may appear to one skilled in the art to which this invention relates during the extensive manufacture of the same and I, therefore, reserve the right to make such alterations or changes as shall fairly fall within the scope of the appended claim.

What I claim is:

In an air-vent oiler having a container and a spout extending from said container, said container being provided with an aperture in its side, an air tube partly within said container and having its lower open end registering with said aperture, whereby said air tube is vented to the outer atmosphere at said lower end, said air tube having its upper end extending into said spout a considerable distance, said air tube being provided at its upper end with a loop having curved ends, said loop constituting a trap, the extreme outer end of said loop opening towards the discharge end of said spout, and said loop and the portion of said air tube within said spout being spaced entirely free of the inner wall of said spout.

JOHN B. SWAN.